Patented May 25, 1943

2,320,099

UNITED STATES PATENT OFFICE 2,320,099

VAPOR-GLAZED CERAMIC PRODUCT AND METHOD FOR PRODUCING THE SAME

William S. Ramsay, Canton, and George A. Bole, Columbus, Ohio, assignors to The Stark Brick Company, Canton, Ohio, a corporation of Ohio No Drawing. Application September 24, 1940, Serial No. 358,130

10 Claims. (Cl. 25—156)

This invention relates to glazed ceramic ware and the production thereof. More particularly, the invention is concerned with the glazing of ceramic ware by the employment of volatile compounds of various salts, being also directed to the conditioning of such ware in order to enable the same to more effectively receive and retain an improved glaze thereon.

Salt or vapor glazing of ceramic ware has been carried out for many years principally by the volatilization of sodium chloride during the burning or maturing of the ware in a kiln, especially so in the glazing of brick. Such brick constitute a very substantial part of the glazed face brick now made and sold. A point is being rapidly reached, however, where ordinary salt-glazed brick, as now generally produced, will no longer be demanded and used. This condition is largely attributable to two defects common in ordinary salt glazing, namely, the tendency of such glaze to develop a fine craze and, secondly, the failure thereof to meet the solubility resistance requirements of glazed products.

With practically no exception, vapor-glaze brick, when drawn from the kiln, or immediately subsequent thereto, craze in a characteristic manner. This crazing is so fine that it is often invisible to the naked eye, requiring a magnifying glass to distinguish the effect. When ink or an inorganic dye is dropped on such a surface and allowed to penetrate these very fine cracks in the glaze, a permanent stain develops which cannot be removed.

Another defect which develops in a crazed salt glaze is the tendency of what is known as "green stain" to come to the surface. This green or vanadium stain is common to fire-clay products, especially when the latter are fired lightly. If a non-crazing glaze be provided, there is no evaporation from the surface and, therefore, no such stain is permitted to form.

The tendency of a sodium chloride glaze to craze lies in the fact that it possesses an extremely high soda content. Such content produces a high expansion glaze which upon cooling places the glaze in tension, the tension so stretch causing the glaze to fail in the characteristic manner above noted.

Investigations have disclosed that glazes containing the following oxides have coefficients of expansion decreasing in the following order, the figures giving one of the factors suggested by Winkleman and Schott in determining the expansion of a glaze or glass.

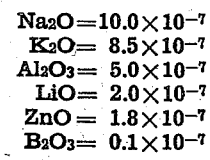

$Na_2O = 10.0 \times 10^{-7}$
$K_2O = 8.5 \times 10^{-7}$
$Al_2O_3 = 5.0 \times 10^{-7}$
$LiO = 2.0 \times 10^{-7}$
$ZnO = 1.8 \times 10^{-7}$
$B_2O_3 = 0.1 \times 10^{-7}$ It is, therefore, apparent that if a satisfactory non-crazing salt glaze is to be produced, oxides or salts of the oxides found in the lower part of the above list should be present. Any oxide or mixture of oxides should have a mean coefficient of expansion factor lower than $3 \times 10^{-7}$. There are other factors, of course, which should be taken into consideration, such as the coefficient of elasticity and the strength and thermal conductivity of a glaze, all of which contribute to the resistance of the glaze to sudden temperature change. These latter factors, however, are of secondary importance as compared to the thermal expansion in evaluating craze resistance. Since it is necessary to vaporize a salt or oxide introduced into a kiln to produce a vapor glaze, we, therefore, preferably employ, in carrying out our invention, a salt that is volatile at or below the operating temperature in the kiln where the ware is matured.

Another important feature of our invention resides in the discovery that a non-crazing vapor-glaze may be applied to ceramic ware when the outer surfaces of the clay bodies of such ware are first prepared or conditioned for the reception of the glaze. In effecting such conditioning, we produce an interface on the surface of the ware adapted to receive the glaze, such interface possessing a composition enabling it to vitrify, or become at least semi-vitrified, upon the firing of the ware, causing it to act as an improved bond in uniting the subsequently applied glaze with the ware body, thus relieving the glaze of the craze-producing strains present in prior methods of vapor-glazing.

With these and other considerations in view, it is an object of the present invention to provide an improved kiln-fired, vapor-glazed, ceramic product composed of a clay body wherein one or more of the surfaces of said body is provided with an interface composed in part, at least, of a clay which will vitrify, or become semi-vitrified, when the product is subjected to customary firing temperatures, the same interface having applied thereto, at the time of firing, a vapor-glaze composed of a salt, or mixture of salts, volatile under said firing temperatures and conditions, whereby the glaze of said product is characterized by its improved resistance to crazing and acid attack.

Another object of the invention resides in an improved method of salt glazing brick, as well as other ceramic ware, to produce on such brick or ware an improved glaze having marked ability to resist crazing, acid attack, stains and other undesirable discoloration.

A further object resides in a method of conditioning brick, or other ceramic ware, for the reception of a vapor-glaze by providing the glaze-receiving surfaces of the bodies of such brick or ware with an interface or engobe composed of a clay which will vitrify at a temperature lower than the vitrification temperature of the clay forming the bodies of such bricks or ware.

A still further object resides in a process for vapor glazing ceramic ware which consists in the employment of a salt, or combinations of salts, which volatilize at a lower temperature than does sodium chloride, such as the use of lithium and a metallic zinc or zinc chlorides.

Still another object of the invention resides in a process for accomplishing the results set forth and one which may be carried out in a practical and economical manner without the aid of special apparatus or materially increasing the usual cost of producing salt-glazed brick.

We have found that lithium or zinc chloride constitute materials that can be used successfully in the present invention in producing non-crazing vapor-glazes. Lithium or zinc chloride volatilizes at a lower temperature than does sodium chloride, which impart to the former materials an added advantage in that a glaze can be developed at lower firing temperatures than is possible with sodium chloride. We have found also that a satisfactory glaze can be developed using much less lithium or zinc chloride than is obtained when using sodium chloride alone. Both lithium and zinc chloride are, however, more expensive than sodium chloride. For reasons of economy, therefore, in some cases, we use a mixture of lithium or zinc chloride and sodium chloride, or we may use lithium or zinc chloride alone during a first application of salt vapor, and a mixture of the lithium or zinc chloride and sodium chloride in the subsequent applications effected during a single firing. This latter procedure will give a lithium or zinc base glaze which will make the superimposed glaze less likely to craze. In fact, this procedure may be carried out so far as to permit the use of sodium chloride alone in the later applications of salt.

Inasmuch as the cost of operation is an important factor, and since lithium chloride and zinc chloride are more costly materials than sodium chloride, another method of decreasing the cost of the glaze is to use a lithium brine rather than the dehydrated salt.

We have found that a salt glaze applied to vitrified or semi-vitrified clay bodies is not so likely to craze as when applied to a body having a more porous or open structure. Improved results may be obtained in many instances by the use of a glaze-receiving interface on the clay, which will vitrify at a temperature lower than the vitrification temperature of the body itself. Ordinary ball clay, for example, may be used as the engobe. Lithium, in the form of spodumene, lepidolite, syenite, litho-spar and the like, may be admixed with the ball clay forming the interface or engobe, which upon the firing of the product, produces a conditioned surface on which to apply a non-crazing glaze. Zinc oxide or lithium carbonate in limited quantities may be added to the engobe. In certain instances, where the clay forming the ware vitrifies, at a comparatively low temperature, the engobe may be omitted and the glaze applied directly to the clay body, provided the expansion of the body is right.

As illustrative of our invention, a procedure which we have found to work successfully on a kiln containing 6000 bricks was as follows:

One dipper (5 pounds) of lithium chloride brine was put in each of three fire boxes, when the kiln temperature had reached 2100° F., which temperature was sufficient to mature the ware. The damper of the kiln was lowered to permit the lithia fumes or vapors to remain in the kiln as long as possible. After 20 minutes, a second salting, using the same procedure as formerly, was carried out. Trials were then drawn which disclosed that the ware at the top of the kiln had an acceptable although not brilliant glaze. A third salting after an interval of 20 minutes produced a highly satisfactory glaze that was not crazed. The kiln after cooling was found to contain brick glazed much more satisfactorily than ordinary commercial grade. The glaze was entirely uncrazed and was insoluble in 10 per cent. hydrochloric acid. In this regard the brick conforms with the standards of the American Society for Testing Materials specification (C126–39T, section 9 (c)) which specifies that a glaze shall resist the action of 10 per cent. hydrochloric acid for three hours at room temperature. The lithia glaze produced by the present invention is not soluble in this strength of acid as are the ordinary commercial glazes of the salt vapor type.

In another procedure, the kiln was fired in the usual manner to a point permitting the ware to mature. Lithium chloride brine was sprayed onto the fires to the amount of about 3 gallons. A solution of sodium chloride (60%) and lithium chloride (40%) on a dry basis was sprayed into the kiln under pressure at intervals until the desired glaze was obtained. After this, the kiln was cooled in the usual manner.

We are aware of the fact that the use of lithium chloride together with other salts such as sodium, potassium and/or zinc chlorides have been proposed heretofore in producing glaze on ceramic ware. In such earlier processes, the primary aim apparently was to obtain a glaze of brilliant luster, and not to reduce or eliminate crazing or increase resistance to acid attack. This is evidenced by the fact that earlier processes advocate the use of potassium chloride as a superior glaze-forming salt, in spite of the fact that potassium chloride does not produce a craze-free glaze, nor will it produce an insoluble acid-resisting glaze. While the present invention also produces a glaze of an improved appearance, the appearance is incidental to the primary end of obtaining the acid-resisting and craze-free glaze.

We consider a large part of the success of our process is attributable not only to the employment of the readily volatilizable salts or oxides having low coefficients of expansion, as set forth above, but also to the fact that the surface of the clay ware which receives the glaze is a non-porous vitrified one, well adapted to relieving the glaze of excess craze-producing tensions.

That is, the surface of the clay body of the ware is conditioned in order to produce a proper base upon which may be deposited a crazeless salt glaze with the employment of any of the so-called vapor glazes. This is usually secured by coating or spraying the glaze-receiving surfaces of the clay body with the engobe specified, or other engobes producing a vitrified surface at the temperatures used. This engobe may consist of a lower vitrifiable clay than the clay composing the body of the ware or a low vitrifying clay together with fluxes and oxides, such, for instance, as spodumene, lepidolite, syenite, feldspars, together with certain low-expansion oxides as lithia, zinc, magnesia, silica, boric oxide and the like. It will be understood that if the body of the clay vitrifies under the firing temperatures employed in the kiln, the engobe may be omitted.

The clay ware prepared in this manner, with at least a surface thereof composed of a material which will vitrify when fired, is then placed in a kiln and burned in a customary manner. At the proper time during the burning, the salt is thrown upon the fires or introduced directly into the kiln. In an alternative procedure, the volatile salt compounds may be placed in solution and sprayed upon the engobe before burning. Sodium silica fluoride is also suitable, and may be substituted either in whole or in part for lithium or zinc chloride.

In another variation of our process, sodium chloride is introduced into the kiln during firing and a relatively large amount of a volatile material containing zinc, such as zinc chloride, is added to the sodium chloride, or introduced into the kiln simultaneously therewith. Other materials containing zinc can also be used, such as zinc oxide and metallic zinc. Instead of using only a small percentage of zinc chloride or other volatile containing zinc, the amount of zinc used should be at least equal to the salt for obtaining good results. By using eight parts of a volatile material containing zinc to five parts of sodium chloride, excellent results have been obtained.

Instead of mixing the zinc with the salt, or otherwise introducing it directly into the kiln, the volatile material containing zinc may be placed in solution and sprayed upon the engobe or surface of the ware before burning.

While our invention has been described in some considerable detail, with reference to permissible procedures, materials and conditions which we now consider important in obtaining introduction of a non-crazing, acid resisting vapor-glazed brick, or other analogous ceramic products, neverthless, it will be understood that we do not desire to be specifically limited to the precise disclosures above set forth, but reserve the right to employ all such variations and modifications of our invention that may be said to fall fairly within the scope of the following claims.

What is claimed is:

1. The method of salt glazing ceramic ware which consists in forming the ware with the surfaces thereof composed of a material which vitrifies when fired, spraying a solution containing a zinc salt upon the surfaces of the ware prior to its burning and volatilizing sodium chloride in a kiln containing the ware during the burning thereof.

2. The method of salt glazing ceramic ware which consists in spraying the ware before firing with an engobe which vitrifies when fired to form a non-porous surface, spraying a solution of zinc chloride upon surfaces of the ware prior to its burning and then volatilizing sodium chloride in a kiln containing the ware during the burning thereof.

3. A fired vapor glazed ceramic product comprising a clay body having a non-porous vitrified surface and a non-crazing salt glaze on said non-porous surface whose oxides have a coefficient of expansion factor lower than $3 \times 10^{-7}$ and insoluble in hydrochloric acid.

4. A fired vapor glazed ceramic product comprising a clay body, an engobe on said body having a non-porous vitrified surface and a non-crazing salt glaze on said non-porous surface whose oxides have a coefficient of expansion factor lower than $3 \times 10^{-7}$ and insoluble in hydrochloric acid.

5. The method of producing glazed ceramic ware, which comprises subjecting the ware composed of clay to kiln temperatures sufficiently high to effect at least partial vitrification of the surface of the ware and forming a non-porous surface, and volatilizing in the kiln atmosphere around the ware, a material whose oxides have a coefficient of expansion factor lower than $3 \times 10^{-7}$ and forming on the non-porous surface of the ware a non-crazing glaze insoluble in hydrochloric acid.

6. The method of producing glazed ceramic ware, which comprises surfacing the body of such ware, prior to subjecting the same to elevated temperatures, with an engobe, subjecting the ware and engobe to kiln temperatures sufficiently high to effect at least partial vitrification of the surface of the engobe and form a non-porous surface, and volatilizing in the kiln atmosphere around the ware, a material whose oxides have a coefficient of expansion factor lower than $3 \times 10^{-7}$ and forming on the non-porous surface of the engobe a non-crazing glaze insoluble in hydrochloric acid.

7. The method of producing glazed ceramic ware, which comprises surfacing the body of such ware, prior to subjecting the same to elevated temperatures, with an engobe of a clay which vitrifies at a temperature lower than the vitrification temperature of the clay from which the ware is formed, subjecting the ware and engobe to kiln temperatures sufficiently high to effect at least partial vitrification of the surface of the engobe and form a non-porous surface, and volatilizing in the kiln atmosphere around the ware, a material whose oxides have a coefficient of expansion factor lower than $3 \times 10^{-7}$ and forming on the non-porous surface of the engobe a non-crazing glaze insoluble in hydrochloric acid.

8. The product in accordance with claim 3 in which the glaze is produced from the vapors of a volatile material comprising lithium.

9. The product in accordance with claim 3 in which the glaze is produced from the vapors of a volatile material comprising zinc.

10. The product in accordance with claim 3 in which the glaze is produced from the vapors of a volatile material comprising sodium silica fluoride.

GEORGE A. BOLE.
WILLIAM S. RAMSAY.